(12) United States Patent
Furht et al.

(10) Patent No.: US 12,250,390 B2
(45) Date of Patent: *Mar. 11, 2025

(54) DECODER WITH MERGE CANDIDATE REORDER BASED ON COMMON MOTION VECTOR

(71) Applicant: OP Solutions LLC, Amherst, MA (US)

(72) Inventors: Borivoje Furht, Boca Raton, FL (US); Hari Kalva, Boca Raton, FL (US); Velibor Adzic, Canton, GA (US)

(73) Assignee: OP Solutions, LLC, Amherst, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,420

(22) Filed: Sep. 13, 2022

(65) Prior Publication Data

US 2023/0007288 A1  Jan. 5, 2023

Related U.S. Application Data

(63) Continuation of application No. 17/006,732, filed on Aug. 28, 2020, now Pat. No. 11,451,810, which is a continuation of application No. PCT/US2020/035910, filed on Jun. 3, 2020.

(60) Provisional application No. 62/856,339, filed on Jun. 3, 2019.

(51) Int. Cl.
*H04N 19/44* (2014.01)
*H04N 19/105* (2014.01)
*H04N 19/129* (2014.01)
*H04N 19/176* (2014.01)
*H04N 19/184* (2014.01)
*H04N 19/96* (2014.01)

(52) U.S. Cl.
CPC .......... *H04N 19/44* (2014.11); *H04N 19/105* (2014.11); *H04N 19/129* (2014.11); *H04N 19/176* (2014.11); *H04N 19/184* (2014.11); *H04N 19/96* (2014.11)

(58) Field of Classification Search
CPC .. H04N 19/105; H04N 19/129; H04N 19/176; H04N 19/184; H04N 19/44; H04N 19/96; H04N 19/52; H04N 19/527; H04N 19/54
See application file for complete search history.

(56) References Cited

U.S. PATENT DOCUMENTS

2018/0359483 A1* 12/2018 Chen .................... H04N 19/176

* cited by examiner

*Primary Examiner* — Dakshesh D Parikh
(74) *Attorney, Agent, or Firm* — OP Solutions IP Department; Paul Ackerman

(57) ABSTRACT

A decoder includes circuitry configured to receive a bitstream; construct, for a current block, a motion vector candidate list including a motion vector candidate having motion information that characterizes a global motion vector; reorder the motion vector candidate list such that the motion vector candidate having the motion information that characterizes the global motion vector is first in the reordered motion vector candidate list; and reconstruct pixel data of the current block and using the reordered motion vector candidate list. Related apparatus, systems, techniques and articles are also described.

9 Claims, 9 Drawing Sheets

DECODER WITH MERGE CANDIDATE REORDER BASED ON COMMON MOTION VECTOR

CROSS-REFERENCE TO RELATED APPLICATIONS

This application is a continuation of U.S. application Ser. No. 17/006,732, filed on Aug. 28, 2020, and entitled "MERGE CANDIDATE REORDER BASED ON GLOBAL MOTION VECTOR," which is a continuation application of international application PCT/US20/35910, filed on Jun. 3, 2020, and entitled "MERGE CANDIDATE REORDER BASED ON GLOBAL MOTION VECTOR," and also claims the benefit of priority of U.S. Provisional Patent Application Ser. No. 62/856,339, filed on Jun. 3, 2019, and titled "MERGE CANDIDATE REORDER BASED ON GLOBAL MOTION VECTOR," each of which is hereby incorporated by reference herein in its entirety.

FIELD OF THE INVENTION

The present invention generally relates to the field of video compression. In particular, the present invention is directed to merge candidate reorder based on global motion vector.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)-2 (also referred to as advanced video coding (AVC) and H.264) standard. Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

SUMMARY OF THE DISCLOSURE

In an aspect, a decoder includes circuitry configured to receive a bitstream, construct, for a current block, a motion vector candidate list including a motion vector candidate having motion information that characterizes a global motion vector, reorder the motion vector candidate list such that the motion vector candidate having the motion information that characterizes the global motion vector is first in the reordered motion vector candidate list, and reconstruct pixel data of the current block and using the reordered motion vector candidate list.

In another aspect, a method includes receiving, by a decoder, a bitstream, constructing, for a current block, a motion vector candidate list including a motion vector candidate having motion information that characterizes a global motion vector, reordering the motion vector candidate list such that the motion vector candidate having the motion information that characterizes the global motion vector is first in the reordered motion vector candidate list, and reconstructing pixel data of the current block and using the reordered motion vector candidate list.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

"Global motion" in video refers to motion and/or a motion model common to all pixels of a region, where a region may be a picture, a frame, or any portion of a picture or frame such as a block, CTU, or other subset of contiguous pixels. Global motion can be caused by camera motion, for example, camera panning and zooming creates motion in a frame that can typically affect the entire frame. Motion present in portions of a video can be referred to as local motion. Local motion can be caused by moving objects in a scene. For example, an object moving from left to right in the scene. Videos may contain a combination of local and global motion. Some implementations of the current subject matter can provide for constructing of a merge candidate list based on the global motion vector that can improve compression by reducing the bits necessary to signal candidates and to code motion vector differences.

Figure 1:
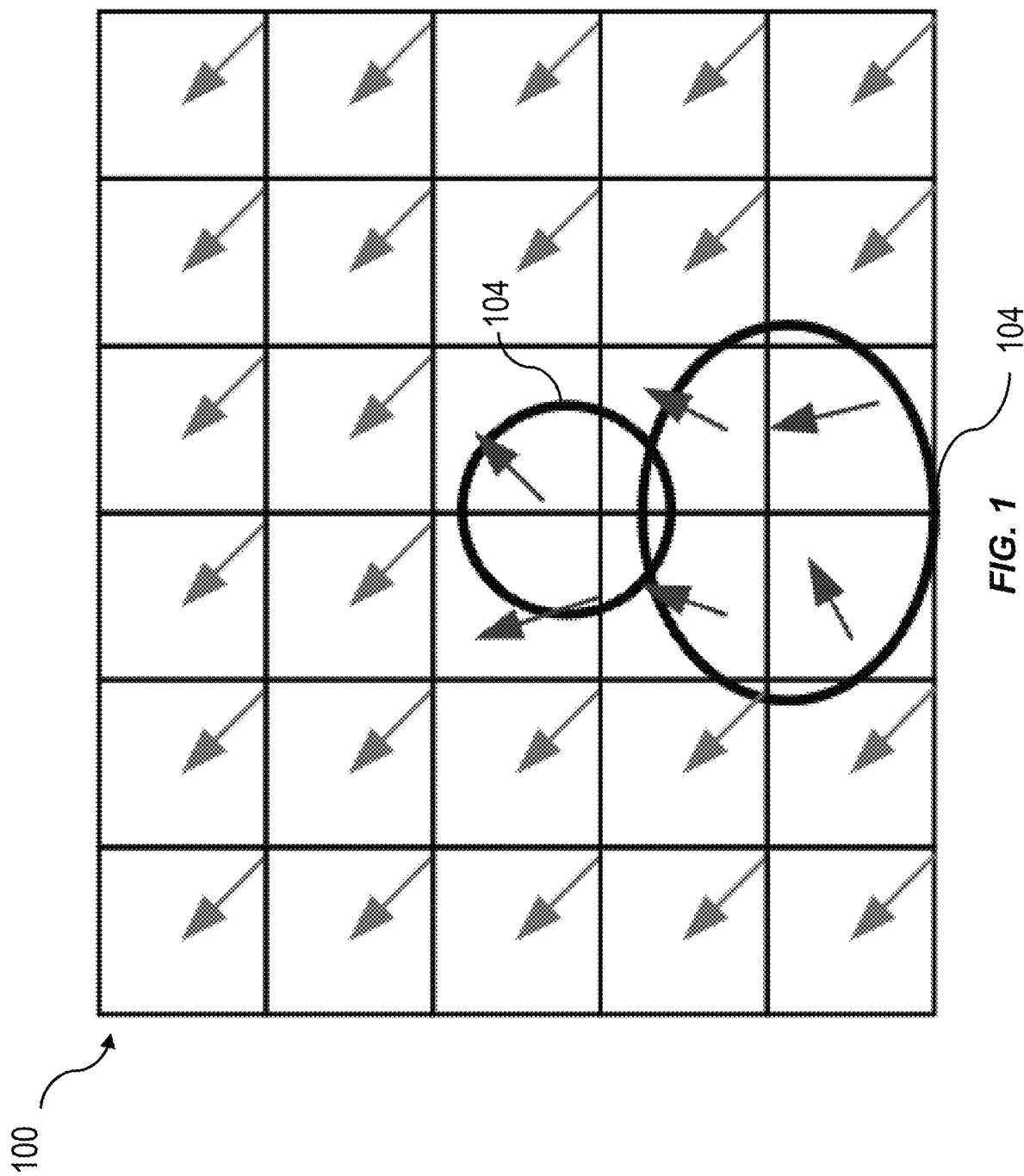
FIG. 1 is a diagram illustrating motion vectors of an example frame with global and local motion.

FIG. 1 is a diagram illustrating motion vectors of an example frame 100 with global and local motion. Frame 100 includes a number of blocks of pixels illustrated as squares, and their associated motion vectors illustrated as arrows. Squares (e.g., blocks of pixels) with arrows pointing up and to the left may indicate blocks with motion that may be considered to be global motion and squares with arrows pointing in other directions (indicated by 104) may indicate blocks with local motion. In the illustrated example of FIG. 1, many of the blocks have same global motion. Signaling global motion in a header, such as a picture parameter set (PPS) or sequence parameter set (SPS), and using the signal global motion may reduce motion vector information needed by blocks and may result in improved prediction.

As an example, and still referring to FIG. 1, simple translational motion may be described using a motion vector (MV), with two components MVx, MVy, that describes displacement of blocks and/or pixels in a current frame. More complex motion such as rotation, zooming, and warping may be described using affine motion vectors, where an "affine motion vector," as used in this disclosure, is a vector describing a uniform displacement of a set of pixels or points represented in a video picture and/or picture, such as a set of pixels illustrating an object moving across a view in a video without changing apparent shape during motion. Some approaches to video encoding and/or decoding may use 4-parameter or 6-parameter affine models for motion compensation in inter picture coding.

For example, a six parameter affine motion may be described as $$x'=ax+by+c$$

$$y'=dx+ey+f$$

A four parameter affine motion may be described as:

$$x'=ax+by+c$$

$$y'=-bx+ay+f$$

where (x,y) and (x',y') are pixel locations in current and reference pictures, respectively; a, b, c, d, e, and f are parameters of an affine motion model.

With continued reference to FIG. 1, A block-based and/or subblock-based affine transform motion compensation prediction may alternatively or additionally be applied. An affine motion field of a block and/or subblock may be described by motion information of two control point (4-parameter) or three control point motion vectors (6-parameter). In a 4-parameter affine motion model, a motion vector at a sample location (x,y) in a block may be derived as:

$$\begin{cases} mv_x = \frac{mv_{1x} - mv_{0x}}{W}x + \frac{mv_{1y} - mv_{0y}}{W} + mv_{0x} \\ mv_y = \frac{mv_{1y} - mv_{0y}}{W}x + \frac{mv_{1y} - mv_{0x}}{W} + mv_{0y} \end{cases}$$

For a 6-parameter affine motion model, motion vector at sample location (x, y) in a block may be derived as:

$$\begin{cases} mv_x = \frac{mv_{1x} - mv_{0x}}{W}x + \frac{mv_{2y} - mv_{0x}}{H} + mv_{0x} \\ mv_y = \frac{mv_{1y} - mv_{0y}}{W}x + \frac{mv_{2y} - mv_{0y}}{H} + mv_{0y} \end{cases}$$

Where $(mv_{0x}, mv_{0y})$ is a motion vector of the top-left corner control point, $(mv_{1x}, mv_{1y})$ is motion vector of the top-right corner control point, and $(mv_{2x}, mv_{2y})$ is a motion vector of the bottom-left corner control point.

In order to simplify the motion compensation prediction, block based affine transform prediction may be applied. As an illustrative example, to derive motion vector of each 4×4 luma subblock, a motion vector of the center sample of each subblock may be calculated according to above equations, and rounded to 1/16 fraction accuracy. Then motion compensation interpolation filters may be applied to generate a prediction of each subblock with derived motion vector. Still continuing the example, sub block size of chroma-components may also be set to be 4×4. A motion vector of a 4×4 chroma subblock may be calculated as the average of the MVs of the four corresponding 4×4 luma subblocks.

As done for translational motion inter prediction, there are also two affine motion inter prediction modes: affine merge mode and affine AMVP mode. Still referring to FIG. 1, parameters used describe affine motion may be signaled to a decoder to apply affine motion compensation at the decoder. In some approaches, motion parameters may be signaled explicitly or by signaling translational control point motion vectors (CPMVs) and then deriving affine motion parameters from the translational motion vectors. Two control point motion vectors (CPMVs) may be utilized to derive affine motion parameters for a four-parameter affine motion model and three control point translational motion vectors (CPMVs) may be utilized to obtain parameters for a six-parameter motion model. Signaling affine motion parameters using control point motion vectors may allow use of efficient motion vector coding methods to signal affine motion parameters.

With continued reference to FIG. 1, some blocks may share the same motion vector information. For example, two blocks corresponding to an object moving across the screen may share the same motion vector as they both relate to the same object. In such scenarios, some approaches to motion compensation may utilize a merge mode, in which neighboring blocks may share a motion vector allowing motion information to be encoded in a bitstream for a first block, and a second block may inherit motion information from (e.g., merge with) the first block. During encoding, a merge list may be constructed containing available merge candidates. A merge candidate may be selected from constructed merge list and an index to the merge list may be signaled in the bitstream. During decoding, merge list may again be constructed from available merge candidates, and an index signaled in the bitstream may be used to indicate which block a current block will inherit motion information from (e.g., merge with).

Figure 2:
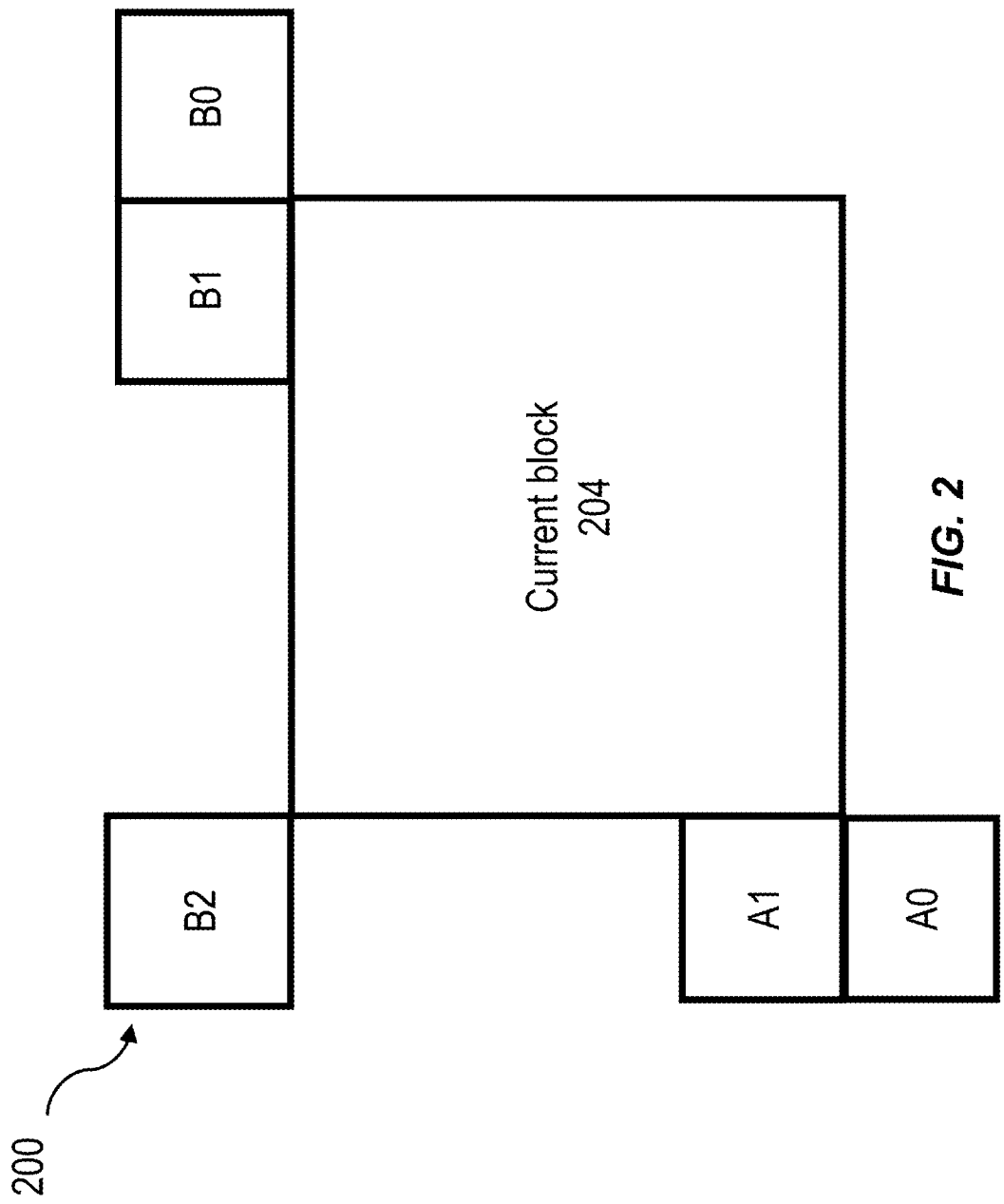
FIG. 2 is a block diagram illustrating spatial candidates that are considered in an approach to merge mode.

FIG. 2 is a block diagram 200 illustrating exemplary embodiments of spatial candidates that may be considered in a typical approach to merge mode, such as is implemented for HEVC. A current block 204 may include a coding unit or prediction unit. Spatial merge candidates may include A0, A1, B0, B1, and B2. A0, A1, B0, and B2 may include neighboring prediction and/or coding units. When creating a merge candidate list, the list may be constructed by considering up to four spatial merge candidates derived from five spatial neighbor blocks, as shown in FIG. 2. In this example, a threshold of five spatial candidates may be imposed. In addition to considering spatial candidates illustrated in FIG. 2, additional candidates that may be considered for addition to the merge list may include one temporal merge candidate that may be derived from two temporal, co-located blocks; combined bi-predictive candidates, and zero motion vector candidates.

Still referring to FIG. 2, spatial merge candidates may be added to merge list in response to determining that they are available. In a quadtree plus binary decision tree (QTBT) partitioning some of the neighbor blocks may be asymmetrical blocks, and therefore they may not be considered as spatial merge candidates because it may be probable that they are asymmetrically partitioned because the partitions (e.g., prediction units) do not share similar motion information.

As noted above, and with continued reference to FIG. 2, in some approaches to video coding merge candidate list may be constructed based on the following candidates: up to four spatial merge candidates that are derived from five spatial neighboring blocks; one temporal merge candidate derived from two temporal, co-located blocks; additional merge candidates including combined bi-predictive candidates; and zero motion vector candidates.

Still referring to FIG. 2, in order to derive the list of spatial candidates, (a) there may be a check whether a neighboring block is available and contains motion information, and (b) redundancy check to avoid having candidates with redundant motion data in the list.

With continued reference to FIG. 2, when N is a number of spatial merge candidates, a complete redundancy check may consist of N×(N−1)/2 motion data comparisons. In case of five potential merge candidates, ten motion data comparisons may be used so that all candidates in merge list have different motion data. This may result in increased complexity of decoder.

In some approaches to video coding, and still referring to FIG. 2, in order to improve coding efficiency, after merge candidate list is constructed (with a processing order of spatial candidate locations being A1, B1, B0, A0, B2), an order of each merge candidate is adjusted according to a template matching cost. Template matching cost may be measured by a Sum of Absolute Difference (SAD) between the neighboring samples of a current coding unit (CU) and their corresponding reference samples. For instance, and without limitation, merge candidates may be ordered in an increasing order of SAD computed with that merge candidate. A number of merge candidates selected using a template matching cost may be limited. For example, a set of four lowest cost candidates among five originally generated and/or provided candidates may be selected.

Still referring to FIG. 2, some implementations of current subject matter may further improve coding efficiency by reordering the merge candidates using global motion vectors. Global motion in video, as used in this disclosure, refers to motion that occurs in an entire frame. Global motion may typically be caused by camera motion such as camera panning and zooming, which affects an entire frame.

Figure 3:
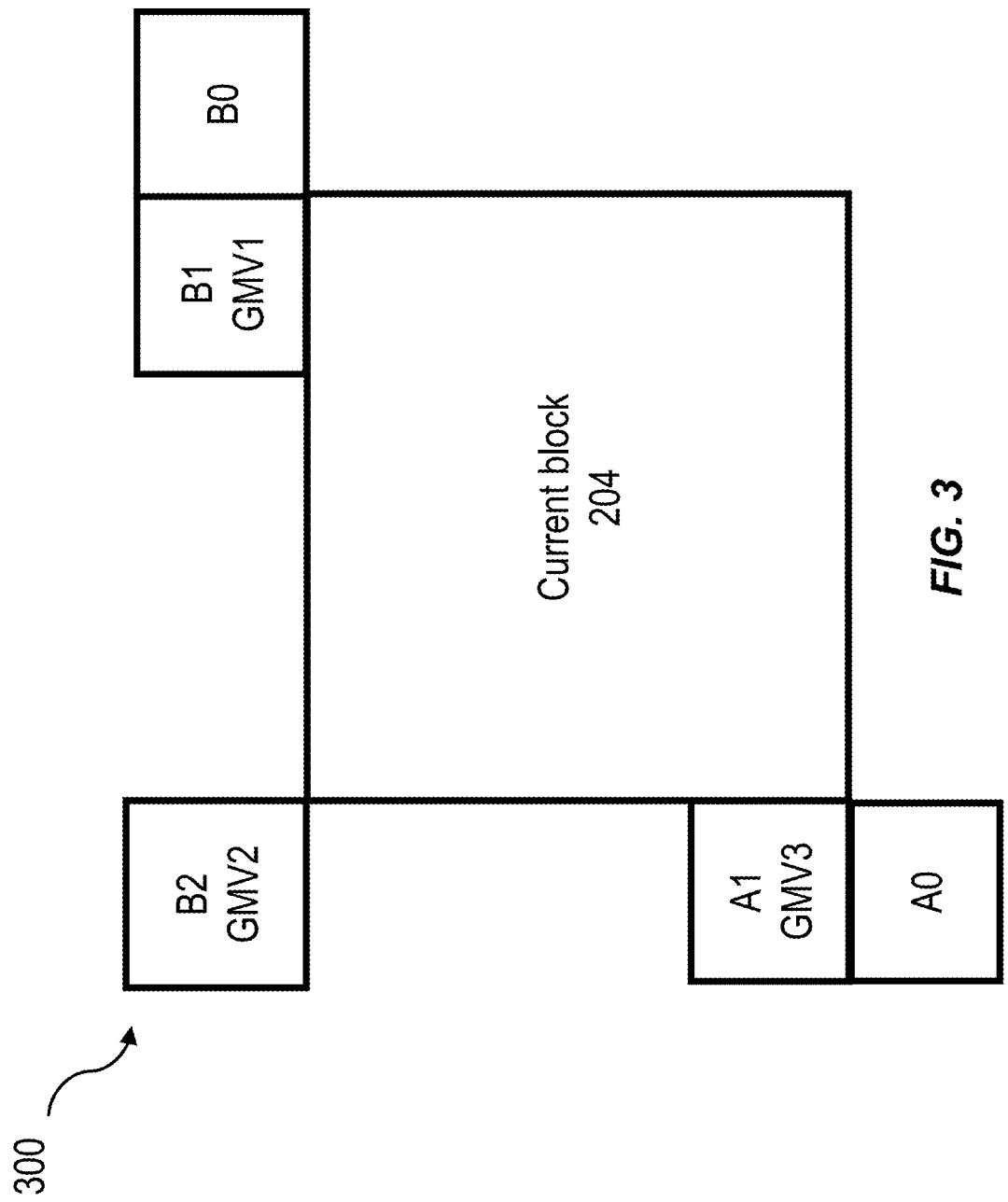
FIG. 3 is a block diagram illustrating spatial candidates and associated global motion vectors that are considered in an approach to merge mode.

Still referring to FIG. 2, some implementations of the current subject matter may create merge candidate list based on motion vectors signaled to decoder. If global motion is signaled, such global motion may be expected to be common to many blocks in a frame. For example, as illustrated for exemplary purposes in FIG. 3, three out of five spatial merge candidates (B1, B2, and A1) may be signaled based on global motions. Based on signaling, at decoder, the decoder may create the following list of merge candidates. They are ordered in such a way that global motion candidates are first in the list as shown in Table 1.

| Updated (re-ordered) merge candidate list |
|---|
| B1—GMV1 |
| B2—GMV2 |
| A1—GMV3 |
| B0 |
| A0 |

Still referring to FIG. 2, since a block is likely to have motion similar to global motion, modifying list so that global motion vectors are first candidates in the list may reduce the bits necessary to signal predictive candidates and to encode motion vector differences. In such a way motion vector coding may be improved and bitrate reduced, which will improve compression efficiency.

Figure 4:
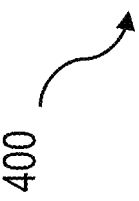
FIG. 4 illustrates three example motion models that can be utilized for global motion including their index value (0, 1, or 2)

In some implementations, and with continued reference to FIG. 2, global motion signaling may be included in a header, such as a PPS or SPS. Global motion may vary from picture to picture. Motion vectors signaled in picture headers may describe motion relative to previously decoded frames. In some implementations, global motion may be translational or affine. Motion mode, such as a number of parameters, whether the model is affine, translational, or the like, which is used may also be signaled in a picture header. FIG. 4 illustrates three example embodiments of motion models 600 that may be utilized for global motion including their index value (0, 1, or 2).

Still referring to FIG. 4, translational CPMVs may be signaled in a PPS. Control points may be predefined. For example, control point MV 0 may be relative to a top left corner of a picture, MV 1 may be relative to a top right corner, and MV 3 may be relative to a bottom left corner of the picture.

Continuing to refer to FIG. 4, global motion may be relative to the previously coded frame. When only one set of global motion parameters are present, the motion can be relative to the frame that is presented immediately before the current frame.

Figure 5:
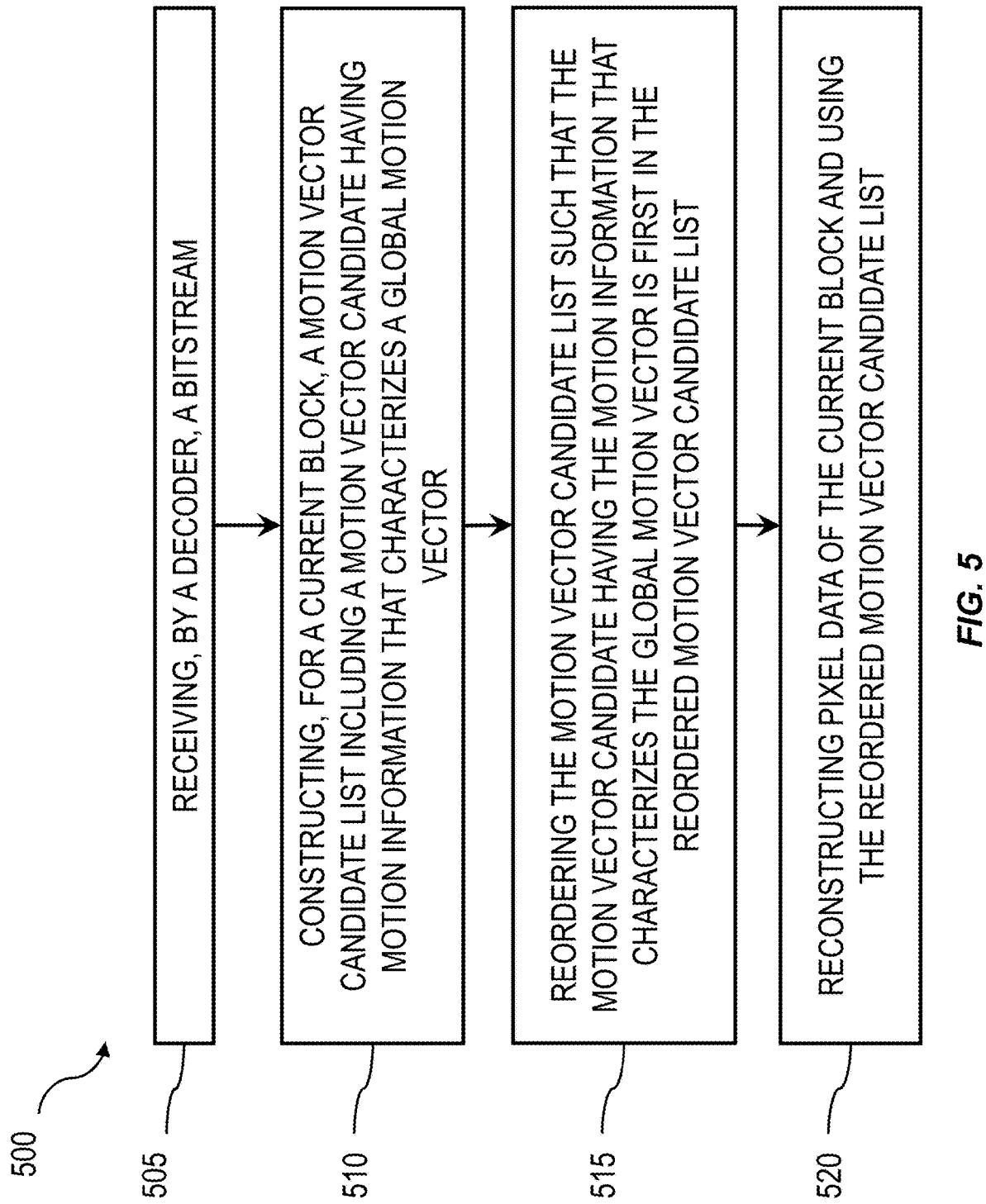
FIG. 5 is a process flow diagram according to some example implementations of the current subject matter.

FIG. 5 is a process flow diagram illustrating an exemplary embodiment of a process 500 of merge candidate reorder based on global motion vector.

At step 505, and still referring to FIG. 5, a bitstream including a current block is received by a decoder. Current block may be contained within a bitstream that decoder receives. Bitstream may include, for example, data found in a stream of bits that is an input to a decoder when using data compression. Bitstream may include information necessary to decode a video. Receiving may include extracting and/or parsing a block and associated signaling information from bit stream. In some implementations, current block may include a coding tree unit (CTU), a coding unit (CU), or a prediction unit (PU).

At step 510, and further referring to FIG. 5, a motion vector candidate list including a motion vector candidate having motion information that characterizes a global motion vector may be constructed for a current block. Global motion vector may be characterized by a header of bitstream, the header including a picture parameter set (PPS) and/or a sequence parameter set (SPS).

At step 515, and continuing to refer to FIG. 5, a motion vector candidate list is reordered such that a motion vector candidate having motion information that characterizes global motion vector is first in the reordered motion vector candidate list. Reordering may include inserting a first global motion vector candidate into merge candidate list. In some implementations, constructing of motion vector candidate list may include reordering.

At step 520, and further referring to FIG. 5, pixel data of current block may be reconstructed using reordered motion vector candidate list.

Still referring to FIG. 5, in some implementations, decoder may be configured to determine global motion is indicated for a current frame that includes current block. Global motion vector may include a control point motion vector. Control point motion vector may include a translational motion vector. Control point motion vector may include a vector of a four parameter affine motion model or a six parameter affine motion model.

Figure 6:
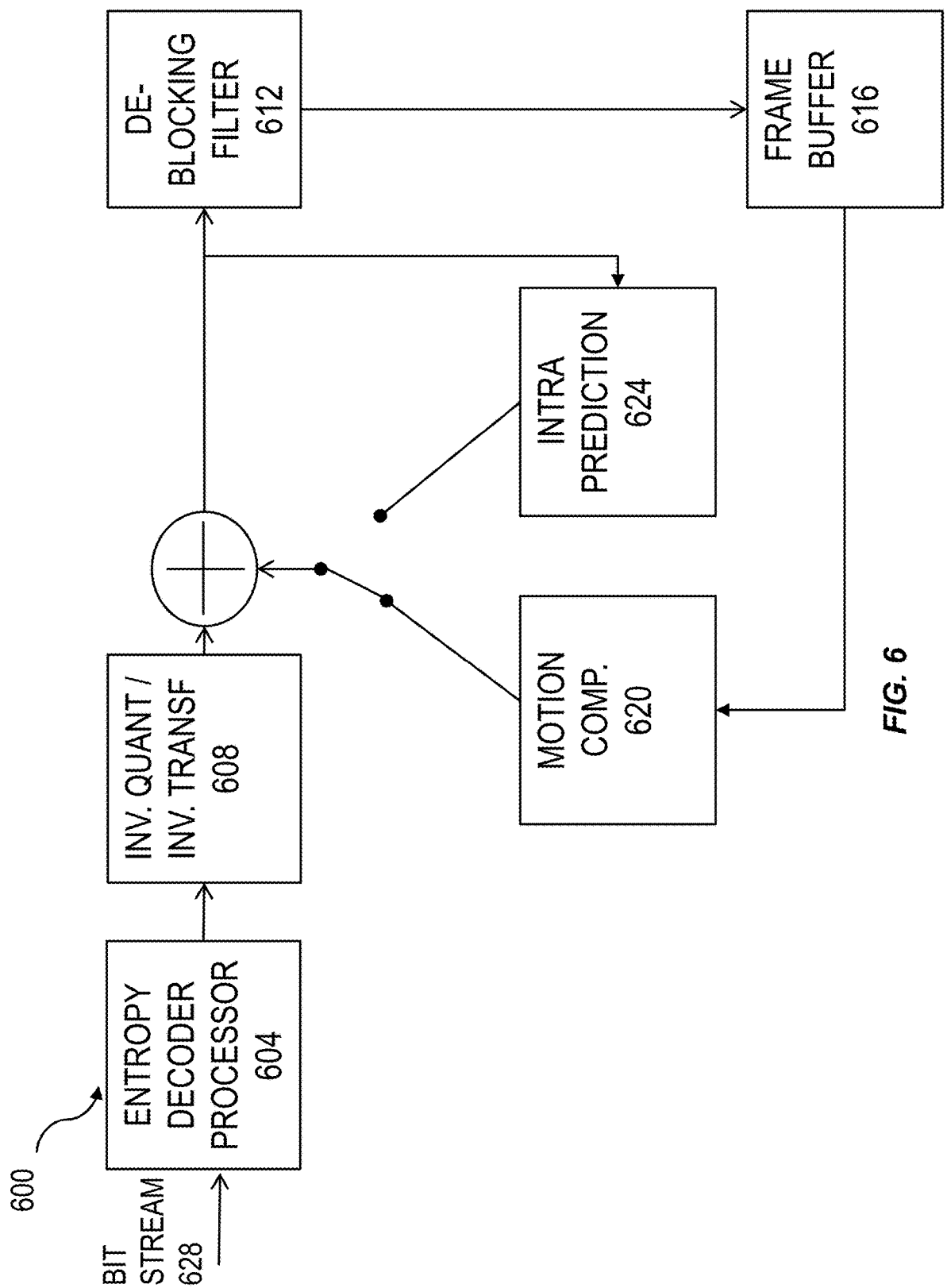
FIG. 6 is a system block diagram of an example decoder according to some example implementations of the current subject matter.

FIG. 6 is a system block diagram illustrating an example decoder 600 capable of decoding a bitstream with merge candidate reorder based on global motion vector. Decoder 600 may include an entropy decoder processor 604, an inverse quantization and inverse transformation processor 608, a deblocking filter 612, a frame buffer 616, a motion compensation processor 620 and/or an intra prediction processor 624.

In operation, and still referring to FIG. 6, bit stream 628 may be received by decoder 600 and input to entropy decoder processor 604, which may entropy decode portions of bit stream into quantized coefficients. Quantized coefficients may be provided to inverse quantization and inverse transformation processor 608, which may perform inverse quantization and inverse transformation to create a residual signal, which may be added to an output of motion compensation processor 620 or intra prediction processor 624 according to a processing mode. An output of the motion compensation processor 620 and intra prediction processor 624 may include a block prediction based on a previously decoded block. A sum of prediction and residual may be processed by deblocking filter 612 and stored in a frame buffer 616.

Figure 7:
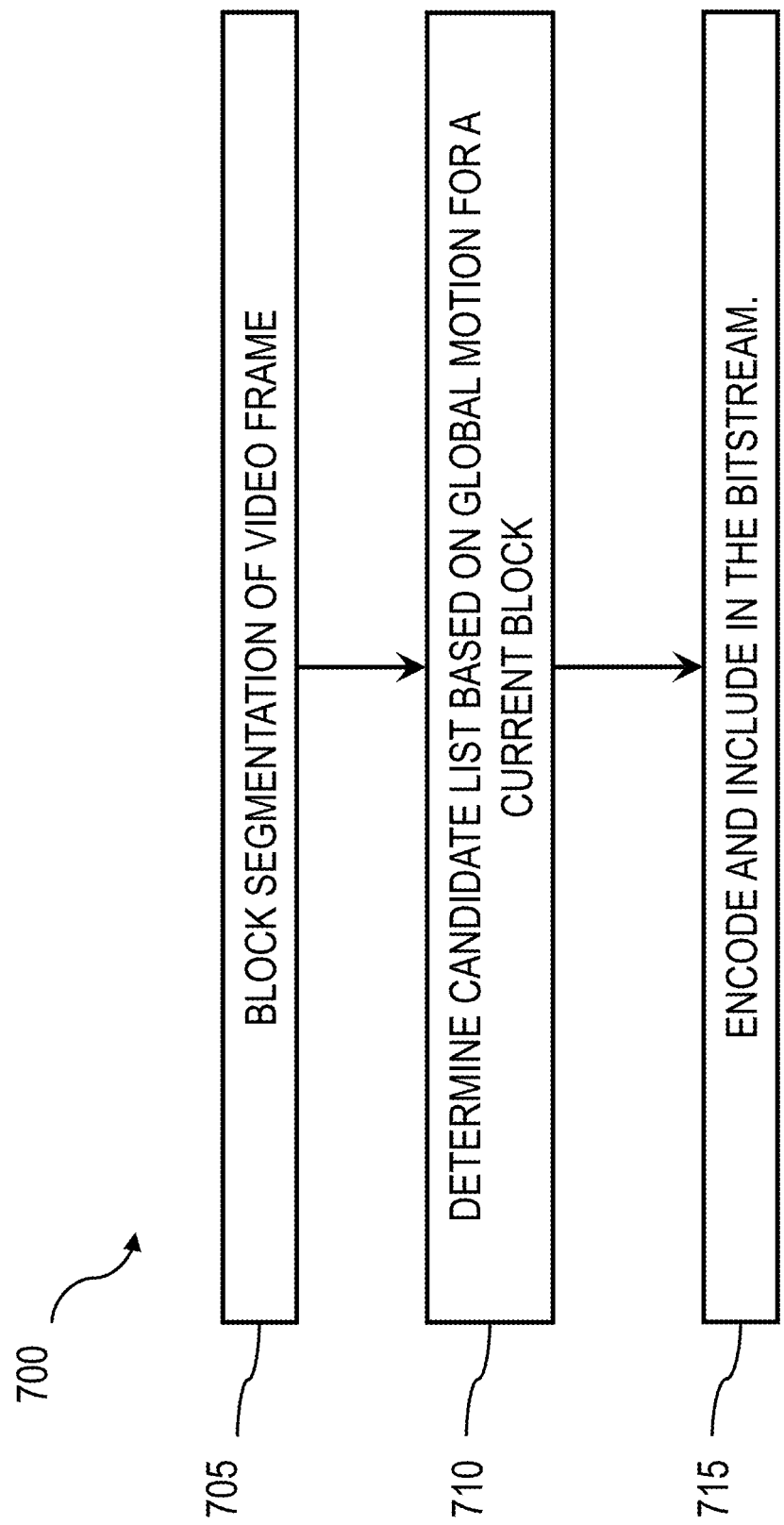
FIG. 7 is a process flow diagram according to some example implementations of the current subject matter.

FIG. 7 is a process flow diagram illustrating an exemplary embodiment of a process 700 of encoding a video with merge candidate reorder based on global motion vector according to some aspects of the current subject matter that can reduce encoding complexity while increasing compression efficiency. At step 705, a video frame may undergo initial block segmentation, for example, using a tree-structured macro block partitioning scheme that can include partitioning a picture frame into CTUs and CUs.

At step 710, a candidate list may be determined. Candidate list may be based on global motion for a current block. Candidate list may include a motion vector candidate having motion information that characterizes a global motion vector. Motion vector candidate list may be reordered such that a motion vector candidate having motion information that characterizes global motion vector is first in the reordered motion vector candidate list. Reordering may include inserting a first global motion vector candidate into merge candidate list. In some implementations, constructing of motion vector candidate list may include reordering.

At step 715, block may be encoded and included in a bitstream. Encoding may include utilizing inter prediction and intra prediction modes, as a non-limiting example. More specifically, an index into reordered candidate list may be included and/or encoded into bitstream for use by a decoder.

Figure 8:
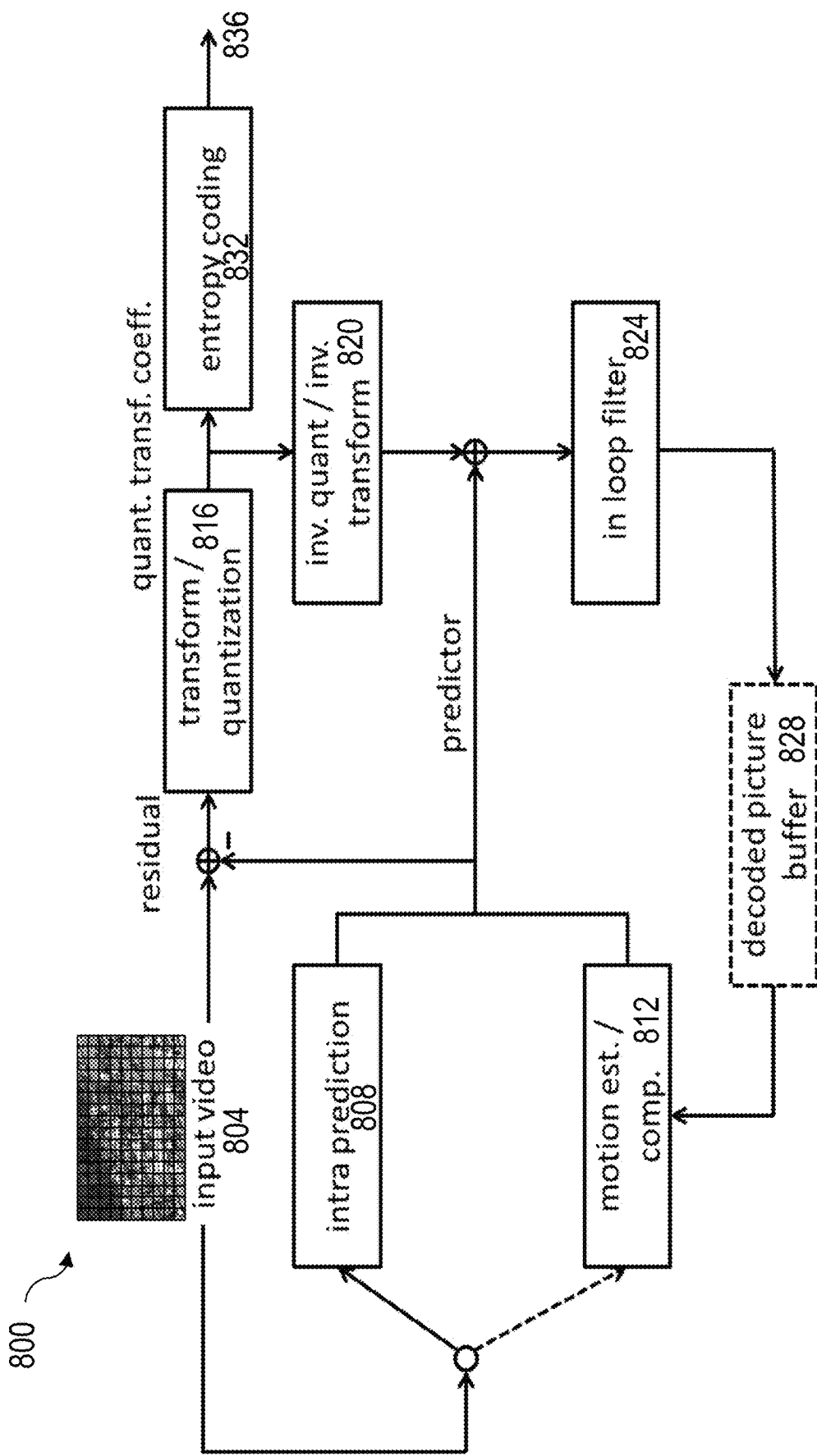
FIG. 8 is a system block diagram of an example encoder according to some example implementations of the current subject matter.

FIG. 8 is a system block diagram illustrating an example video encoder 800 capable of encoding a video with merge candidate reorder based on global motion vector. Example video encoder 800 may receive an input video 804, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 8, example video encoder 800 may include an intra prediction processor 808, a motion estimation/compensation processor 812, which may also be referred to as an inter prediction processor, capable of constructing a motion vector candidate list including adding a global motion vector candidate to the motion vector candidate list, a transform/quantization processor 816, an inverse quantization/inverse transform processor 820, an in-loop filter 824, a decoded picture buffer 828, and/or an entropy coding processor 832. Bit stream parameters may be input to the entropy coding processor 832 for inclusion in the output bit stream 836.

In operation, and with continued reference to FIG. 8, for each block of a frame of input video 804, whether to process block via intra picture prediction or using motion estimation/compensation may be determined. Block may be provided to intra prediction processor 808 or motion estimation/compensation processor 812. If block is to be processed via intra prediction, intra prediction processor 808 may perform processing to output a predictor. If block is to be processed via motion estimation/compensation, motion estimation/compensation processor 812 may perform processing including constructing a motion vector candidate list including adding a global motion vector candidate to the motion vector candidate list, if applicable.

Further referring to FIG. 8, a residual may be formed by subtracting a predictor from input video. Residual may be received by transform/quantization processor 816, which may perform transformation processing (e.g., discrete cosine transform (DCT)) to produce coefficients, which may be quantized. Quantized coefficients and any associated signaling information may be provided to entropy coding processor 832 for entropy encoding and inclusion in output bit stream 836. Entropy encoding processor 832 may support encoding of signaling information related to encoding a current block. In addition, quantized coefficients may be provided to inverse quantization/inverse transformation processor 820, which may reproduce pixels, which may be combined with a predictor and processed by in loop filter 824, an output of which may be stored in decoded picture buffer 828 for use by motion estimation/compensation processor 812 that is capable of constructing a motion vector candidate list including adding a global motion vector candidate to the motion vector candidate list.

With continued reference to FIG. 8, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 8, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 8, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
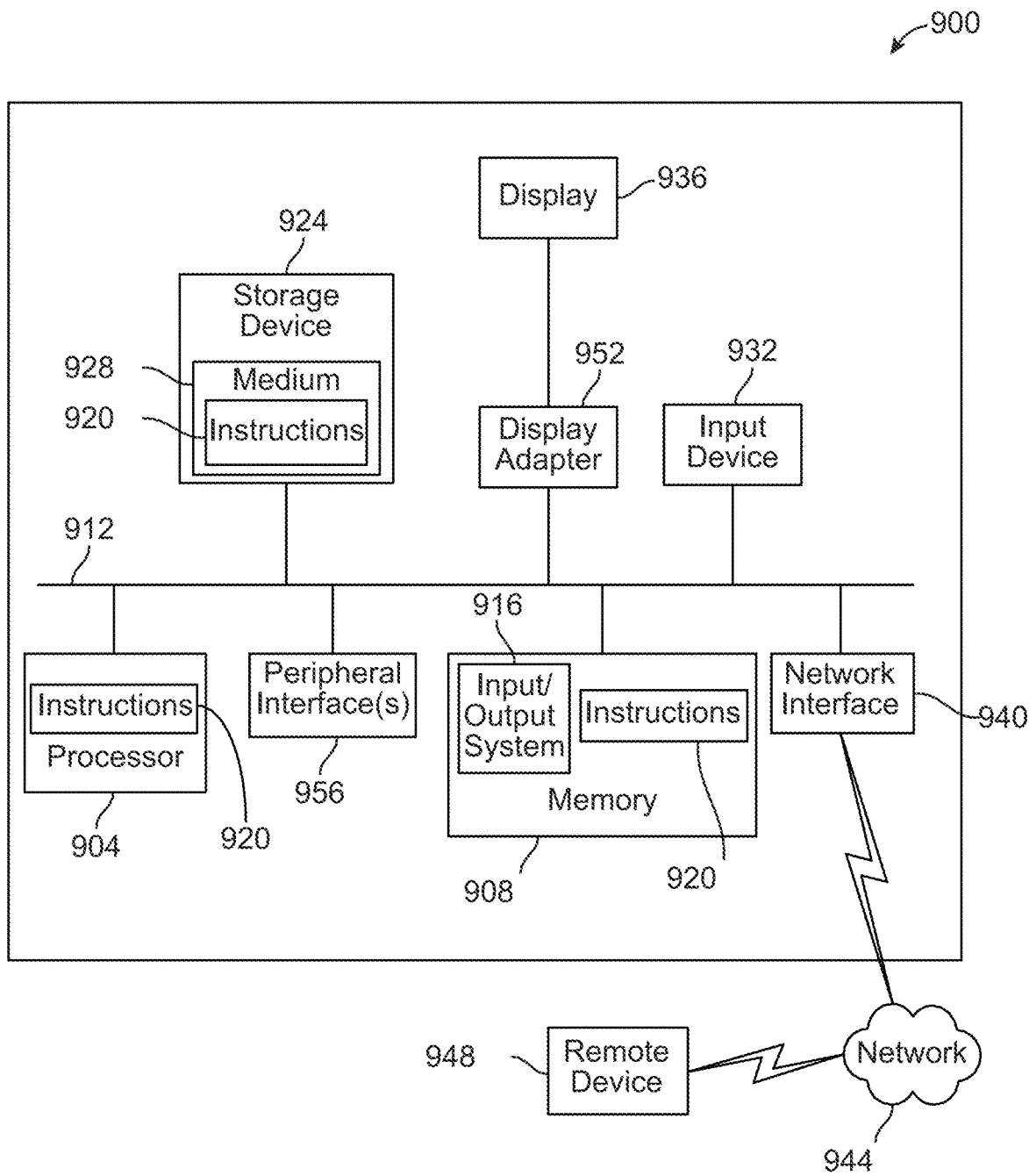
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder, the decoder comprising circuitry configured to:

receive a bitstream including a coded picture, the coded picture including a first region having a first contiguous plurality of coding units and a second region having a second contiguous plurality of coding units;

construct for each coding unit in the first region a motion vector candidate list, each motion vector candidate list having a common motion vector, wherein the motion vector candidate lists are ordered such that the common motion vector is first;

decode the first plurality of coding units using the common motion vector from the motion vector candidate lists, whereby a picture region with common motion is reconstructed in the first region;

ascertain from the bitstream individually determined motion vectors for each coding unit of the second region, wherein adjacent coding units in the second region have different individually determined motion vectors, each individually determined motion vector being one of a translational motion vector for translational motion and a control point motion vector for affine motion; and decode the second plurality of coding units using the individually determined motion vectors, whereby local motion in the second region is reconstructed.

2. The decoder of claim 1, wherein the common motion vector is a control point motion vector.

3. The decoder of claim 1, wherein the common motion vector is a translational motion vector.

4. The decoder of claim 2, wherein the control point motion vector is a vector of a four parameter affine motion model.

5. The decoder of claim 2, wherein the control point motion vector is a vector of a six parameter affine motion model.

6. The decoder of claim 1, the decoder further comprising:
an entropy decoder processor configured to receive the bitstream and decode the bitstream into quantized coefficients;
an inverse quantization and inverse transformation processor configured to process the quantized coefficients including performing an inverse discrete cosine;
a deblocking filter;
a frame buffer; and
an intra prediction processor.

7. The decoder of claim 1, wherein at least a coding unit of the first plurality of coding units forms part of a quadtree plus binary decision tree.

8. The decoder of claim 1, wherein at least a coding unit of the first plurality of coding units is a coding tree unit.

9. The decoder of claim 1, wherein the decoded picture further includes an intra-predicted coding unit.

* * * * *